United States Patent [19]

Werner

[11] 4,249,113

[45] Feb. 3, 1981

[54] LOAD CONTROLLER

[75] Inventor: John W. Werner, Lubbock, Tex.

[73] Assignee: Brandon and Clark Electric Company, Inc., Lubbock, Tex.

[21] Appl. No.: 818,654

[22] Filed: Jul. 25, 1977

[51] Int. Cl.³ .......................... B23Q 5/10; B23Q 5/28
[52] U.S. Cl. ........................................ 318/39; 318/571
[58] Field of Search .................................. 318/39, 571

[56] References Cited

U.S. PATENT DOCUMENTS

| | | | |
|---|---|---|---|
| 3,389,313 | 6/1968 | Reynolds | 318/39 |
| 3,459,378 | 8/1969 | Hill | 318/39 |
| 3,728,595 | 4/1973 | Adams | 318/39 |
| 3,789,279 | 1/1974 | Dempsey et al. | 318/39 |
| 3,962,619 | 6/1976 | Nishimura et al. | 318/39 |
| 3,988,578 | 10/1976 | Weber | 318/39 |
| 4,031,437 | 6/1977 | Dempsey et al. | 318/39 |
| 4,078,195 | 3/1978 | Mathias et al. | 318/571 |

*Primary Examiner*—J. V. Truhe
*Assistant Examiner*—Eugene S. Indyk
*Attorney, Agent, or Firm*—Wendell Coffee

[57] ABSTRACT

A processing system for delinting cotton has a delinter driven by an AC drive motor. The delinter is fed by a feeder/cleaner driven by a DC feed motor. A visual display ammeter measures the current drawn by the drive motor and produces a given load voltage corresponding to the measured current. The load voltage is then translated into a feed voltage to the feed motor, thereby regulating the feed into the delinter at a predetermined rate responsive to the load on the drive motor.

22 Claims, 9 Drawing Figures

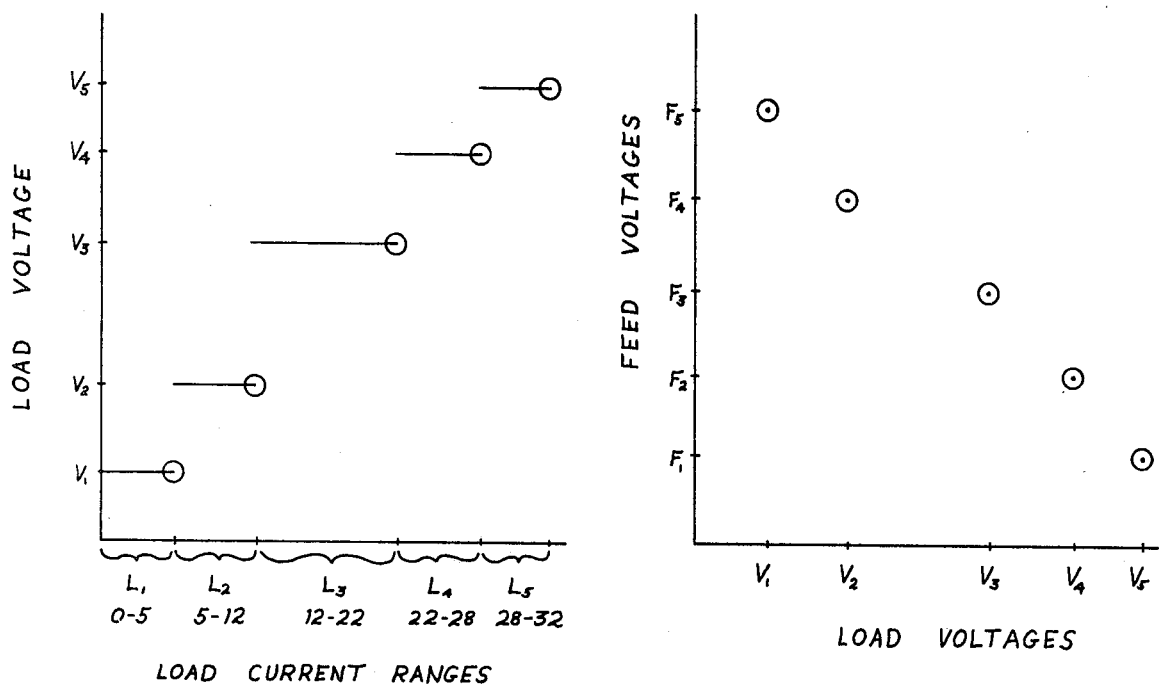
Fig. 6
Fig. 7
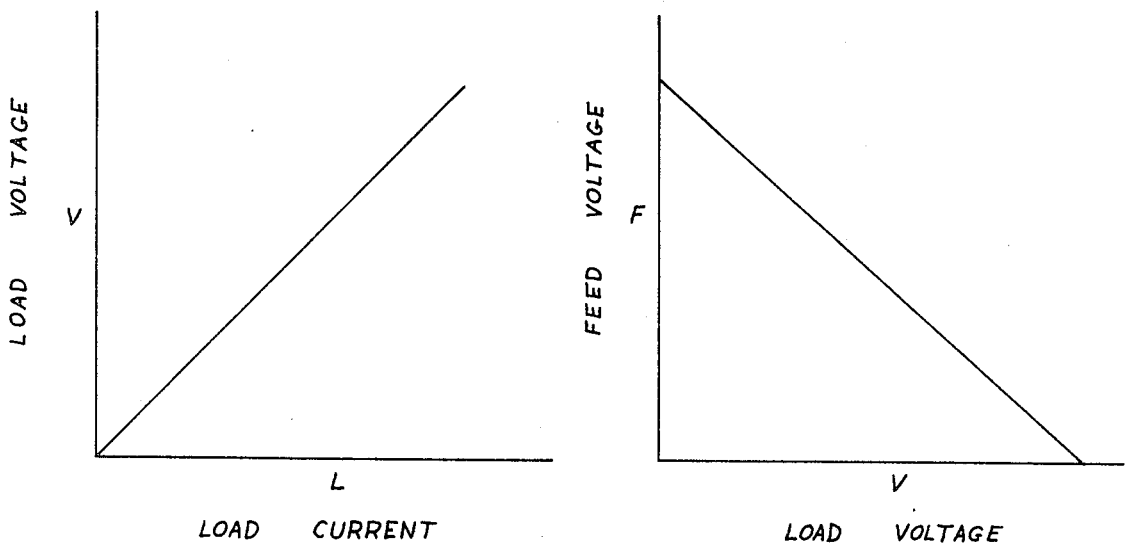
Fig. 8
Fig. 9

LOAD CONTROLLER

BACKGROUND OF THE INVENTION (1) Field of the Invention

This invention relates to controls for processing systems, and more particularly to controlling feeders according to the load on the processing equipment.

(2) Description of the Prior Art

Before my invention, load (power requirement) fluctuations caused problems in processing systems. Non-uniform characteristics of material being processed often resulted in wide variations in the load on the processing machines. The resultant load fluctuations often caused excessive wear of equipment, uneconomical operation and non-uniform product for the processing. Therefore, some means was necessary to control the load on the processing machines.

Workers in the art have previously controlled the load on processing machines by controlling the feed rate. Prior devices provided for variation in the feed rate only when the power to, or load on, the processing machine fell outside an upper or lower limit. The feed rate was altered until the power, or load, fell within the set limits.

DORAN, U.S. Pat. No. 2,129,049, is representative of such prior devices. In DORAN, when the power is outside the range, the rate of feed is *constantly* altered until the power input falls within the desired range. The power input is confined within a single given range, but may fluctuate within that range.

In DORAN, the feed rate is not preset for a given process load condition. The moment the process load returns to the max-min range, the feed rate is fixed at whatever level it adjusted to during a "lag time". In DORAN's process the lag time is the time interval between the moment at which the process load went outside the limits and the moment at which it returned within the limits. Therefore, in DORAN, the feed rate when the process load is within the limits is dependent upon the duration of the previous lag time.

This causes, among others, three problems. First, variance within the maximum and minimum limits is not regulated. Second, the constant alteration of the rheostat during the lag time will result, in most cases, in a non-optimum feed rate for a particular process load. Third, "zero" and "excessive" load rates are not accounted for. If the feeder runs out of material to be processed, there will be a "zero" load condition on the processing machine. Use of the prior devices would result in a constant increase in the feed rate until the feeder ran at top speed. Correspondingly, for a condition wherein the processing machine becomes choked with material and stops, the load rate will be extremely high, thereby constantly decreasing the feed rate to a zero level. However, the zero level will not be reached until after the period of time it takes the motor to wind the rheostat to the zero point.

I was aware of the following prior art before filing this application:

| | |
|---|---|
| Sachs | 682,642 |
| Wyckoff | 1,859,814 |
| Meyer | 1,963,371 |
| Safar | 3,305,720 |
| Favre | 3,732,472 |

-continued

| | |
|---|---|
| Weigele et al | 3,819,991 |

SUMMARY OF THE INVENTION (1) New and Different Function

I have invented a load controller which refines the means for adjusting the feed rate over that found in the prior art. I have invented a completely new way of varying the rate of feed according to the process load on the equipment.

Machines within various processing systems each tend to have their own characteristic process load function corresponding to given conditions. Because process conditions and materials differ, it is important to have a capability for adjusting the feed rate to complement this process load function.

My invention electronically corresponds a preset feed rate to each process load. This permits each process load to be matched with the feed rate necessary to optimize the processing of the material.

For example, in a processing system, assume that if a process load is a given increment above the normal operating load, the decrease in feed rate necessary to optimize operating conditions is a two-fold decrease. Assume also that for double the same increment, the decrease in feed rate necessary to optimize conditions is an eight-fold decrease. The process load function defined by this assumed system is non-linear. The prior art devices are inapplicable because they alter the feed rate constantly during the lag time. My invention, however, is easily able to control such a situation because the feed rate function is defined by predetermined points which may be set to reflect almost any desired function.

My invention permits regulation between maximum or minimum points. Although it may be desirable to control the load rate within certain limits, it may also be desirable to regulate the load rate within those limits, i.e., providing some modification in the feed rate for loads between the maximum and minimum permissible process loads. My invention easily permits this because there is a preset feed rate for each given load.

My invention is particularly adaptable where there is a long lag time between the change in the rate of feed and in the processing equipment. E.g., when an amorphous mass of discrete particles is being fed to a processing machine, the processing machine requires a certain length of time to process the material. It is desirable that the correction be made by fixing a feed rate for each load rather than correcting the feed rate.

My invention solves the zero load and the extreme load conditions by presetting feed rates of zero for loads at or near zero and for loads above a given extreme. As noted before, the closer regulation available with my invention may also prevent such conditions.

My generic invention includes two specie:

(1) a step mode and (2) a continuous mode.

Although these forms of my invention have the same basis (preset feed rates), the effect of their functioning may appear to be different in some cases. The step mode of my invention performs load regulation by corresponding a single preset rate of feed to a given *range of process loads* such that a single feed rate will be produced which corresponds to all loads being within a given load range. As the process load changes from one load range to another, the feed rate will be adjusted accordingly. However, a fluctuation within a load range will not produce a change in feed rate.

The continuous mode of my invention accomplishes load regulation by assigning a preset rate of feed to *each process load*. This differs from the step mode in that *any* change in the process load will result in a corresponding change in the feed rate.

Each of the two modes may be constructed so as to resemble the other mode. For example, the step mode may be set with a great number of ranges very narrow in scope such that each resembles a point. Such a combination of the ranges will define a continuous function. Further, the continuous mode may have the feed rates set such that for a given load range the preset feed rates will be equivalent, thus defining a step function.

Several distinct advantages of economy and utility for both modes become apparent. The continuous mode may be employed to control very sensitive process load/feed rate relationships in which immediate correction in the feed rate is necessary. The continuous mode may also be advantageously used in situations where the load must be confined within very narrow limits. It is noted that a much finer degree of tuning of the feed/load relationship is possible with the continuous mode.

The step mode is very useful in systems where fluctuations in the feed rate may be inconvenient or impossible. For example, assuming a feeder could only be operated at specific speeds, the step mode would allow the feed rate to be adjusted at these specific speeds for given load ranges. With the breadth and values of the load ranges being adjustable, the system can be fine tuned without the necessity for replacing the feed mechanism with variable speed capability. As explained later, the anticipated cost of manufacturing the step mode will be less than that for the continuous mode.

The step mode may also be used in processing systems wherein alteration of the feed rate for small changes in load is not desired. The step mode will allow small changes in load within a load range to occur without the feed rate changing. Yet, for larger variations in load, the feed rate would be changed, thus accomplishing the desired load control while eliminating the fluctuation in the feed rate.

It may be seen that my invention is adaptable for almost any process load function and corresponding feed rate function. By merely employing alternate circuitry well known in the art, my invention may be applied to practically any manufacturing processing system. Thus, the function of my invention is greater than the sum of the functions of the individual circuits, electrical components, motors, processing machines, etc.

OBJECTS OF THE INVENTION

An object of this invention is to regulate power consumed by a processing machine by regulating the feed into the machine.

Another object of this invention is to accomplish the above by feeding material at a preset rate for each load on a processing machine.

Further objects are to achieve the above with a device that is sturdy, compact, durable, lightweight, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive, and does not require highly skilled people to install, adjust, operate, and maintain.

The specific nature of the invention, as well as other objects, uses, and advantages thereof, will clearly appear from the following description and from the accompanying drawing, the different views of which are not scale drawings.

BRIEF DESCRIPTION OF THE DRAWING

FIG. 6 is a graphical protrayal of the relationship between the load current and the load voltage for the step mode of my invention.

FIG. 7 is a graphical portrayal of the relationship between the load voltage and the feed voltage thereof.

FIG. 8 is a graphical portrayal of the relationship between the load current and the load voltage for the continuous mode of my invention.

FIG. 9 is a graphical portrayal of the relationship between the load voltage and the feed voltage thereof.

DESCRIPTION OF THE PREFERRED EMBODIMENTS

Figure 1:
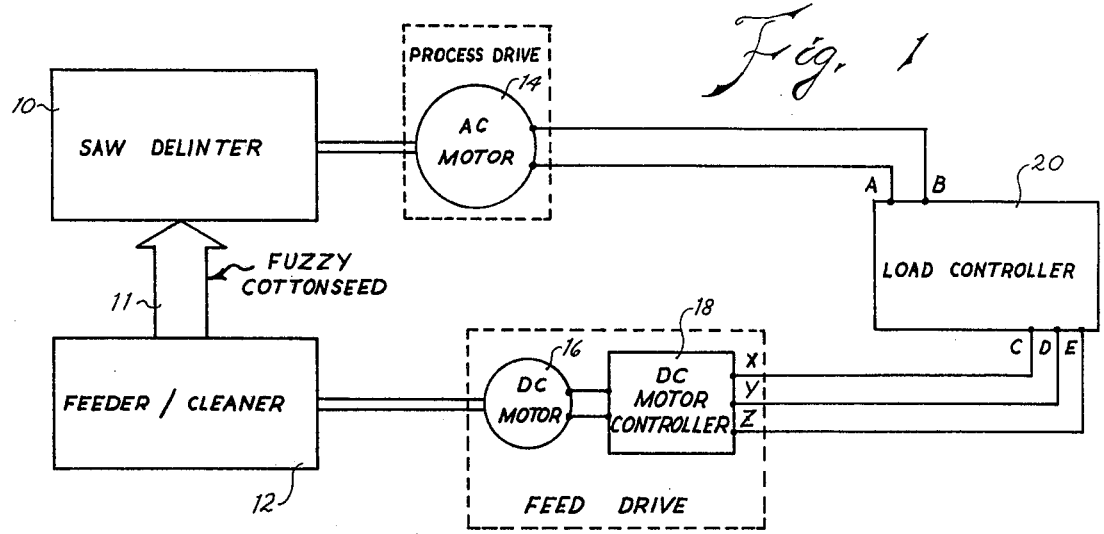
FIG. 1 is a block diagram showing my invention connected to a cottonseed delinting processing system.

Referring to FIG. 1, processing machine 10 in the form of a saw delinter is fed material 11 in the form of fuzzy cottonseed by feeder 12, a feeder/cleaner. The delinter 10 is driven by a process drive which includes AC motor 14 mechanically connected to the delinter 10. The feeder/cleaner 12 is driven by a feed drive which includes DC motor 16 mechanically connected to the feeder/cleaner 12 and DC motor controller 18 electrically connected to the DC motor 16.

The fuzzy cottonseed 11 fed into the delinter 10 is an amorphous mass of discrete particles of varying consistency. The processing of such material at a constant feed rate results in a fluctuation of the load on the delinter for each variance of the material from normal.

Load controller 20 is electrically connected to the DC motor controller 18 at points X, Y, and Z. These conection points are to wires within the DC motor controller 18 which have been disconnected from the tabs of a controller potentiometer (not shown). Points X and Z are connected to wires normally connected to the end tabs of the controller potentiometer and point Y is connected to the wire normally connected to the center tab of the controller potentiometer. Such connections may be easily made, as such DC motor controllers are well known in the art. Those skilled in the art will understand that a conventional source of power is provided to the AC motor 14 and the DC motor 16, but is not shown.

The load controller 20 provides means for measuring a process current drawn by the AC motor 14, which is the means I prefer to employ to indirectly measure the power drawn by the process drive. The load controller 20 also provides means for translating the process current into a feed voltage such that for each measured value of the process current corresponding to a particular process load, a preset feed voltage is produced.

My generic invention includes two specie:
(1) the step mode, and
(2) the continuous mode.

Although an embodiment of each of the two species is described with reference to a particular application of my invention to cottonseed delinting processes, it may be seen that the load controller 20 may be electrically connected to any system having a feeder and processor. Electrically sensed power from any type of process drive may be employed as an input to the load controller. Likewise, any feed drive able to be electrically controlled may be connected to the output of the load controller 20. In addition, the output of the load controller 20 may be altered so as to conform to the requirements of any particular system.

Figure 2:
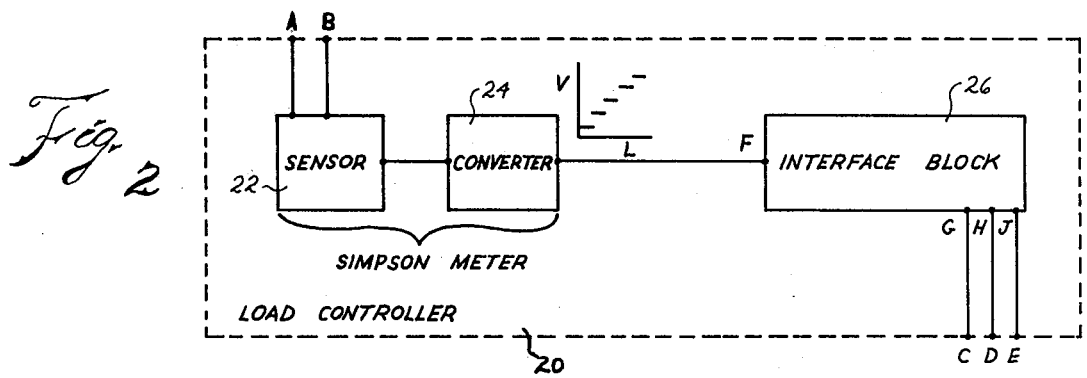
FIG. 2 is a block diagram of a step mode embodiment of the load controller of my invention.

The load controller 20 is connected the AC motor 14 and the DC motor controller 18 at points A, B, C, D, and E, respectively, on the load controller block. For use with a cottonseed delinting system, I have found it most advantageous to have the connection points as described. The step form of my invention is illustrated in FIG. 2 with connection points A, B, C, D, and E as shown in FIG. 1.

STEP MODE

Sensor 22 of the load controller 20 is electrically connected to connection points A and B to provide a means for measuring the current drawn by the AC motor 14. The sensor 22 is electrically connected to converter 24.

The converter 24 converts the load current into preset load or converter output DC voltages corresponding to and representing ranges of process current. Referring to FIG. 6, the process current may be seen to vary along the horizontal axis and the load or converter output voltage may be seen to vary along the vertical axis. The horizontal axis is divided for this particular embodiment into five load ranges corresponding to L1, L2, L3, L4, and L5. The vertical axis is divided into five points labeled V1, V2, V3, V4, and V5 to represent the preset load or converter output voltages. Therefore, it may be seen that for each given load range L1 through L5, there is a particular load or converter output voltage V1 through V5. Thus, because of the foregoing relationships, a variance in the process load and, consequently the process current, *within* any range L1 through L5 *will not* result in an alteration of the feed rate. However, a variation *outside* the load ranges L1 through L5 *will* result in a change of the voltages.

The particular ammeter I prefer to employ combines the sensor 22 and converter 24 into one visual display unit. Through specific variable preset points, the width of the ranges and the values falling within them may be tailored to suit the particular requirements of almost any system. Such meters are commercially available; I employ ANA-Led Model #7527SM, in conjunction with ANA-Led Power Supply Model #30202, manufactured by Simpson, 5200 West Kinzies, Chicago, Illinois 60644. These meters are known in the trade as a Simpson Meter.

For this particular meter, each preset range has a corresponding unique load or converter output voltage, the magnitude of which rises as the process current rises. The function defined by the load or converter output voltages may not have the desired relationship to the variation in the process current. Therefore, the required feed voltages must be produced by single variable circuits independently triggered by each of the load or converter output voltages. Referring to FIG. 6, it may be seen, for example, that the width of the range L3 is greater than that of L2 or L4. Likewise, the difference between the values of L3 and L2 is greater than the difference between L3 and L4.

Figure 3:
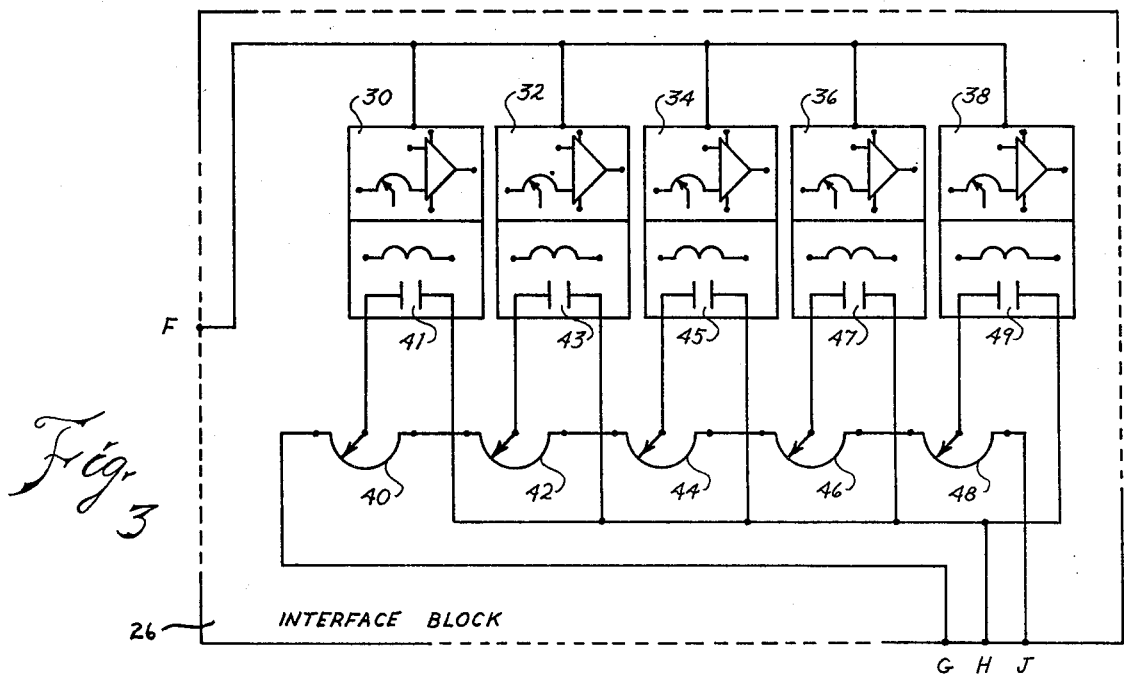
FIG. 3 is a block diagram of the interface block thereof.

Interface block 26 is electrically connected to the output of converter 24. (FIGS. 2 and 3). The interface block 26 provides means for activating a module producing a module voltage. Each module is triggered independently by one of the load or converter output voltages V1 through V5. Since only one voltage V1 through V5 will be produced, only one of the modules will be successively triggered. Referring to FIG. 7, for the load or converter output voltages V1 through V5, as in FIG. 6, the corresponding feed voltages F1 through F5 are spaced in equal steps.

The Simpson Meter which I prefer to use has a plurality of points, in this case 50. For each specific value of input voltage, a single point will be energized, producing a single directly related load or converter output voltage. The interface block 26 includes five step modules 30, 32, 34, 36, and 38 connected to connection point F shown in FIG. 2. As shown in FIG. 7, each step module 30 through 38 is triggered by one of five selected load or converter output voltages V1, V2, V3, V4, or V5. When a module is triggered it produces a corresponding feed voltage or module voltage F1 through F5. Therefore, it may be seen that by altering the module voltage and the trigger voltages of the modules, the feed voltage may be corresponded to any given range of load current. By spacing the present points on the ammeter or converter 24, the values within and the breadth of the load ranges may be set. In this manner, the modules 30 through 38 may be preset to produce a preset feed voltage F1 through F5 when triggered by a related load voltage V1 through V5.

Potentiometers 40, 42, 44, 46, and 48 constitute means for varying the module voltage of each of the step modules and are shown in FIG. 3 to be connected in series to connection points G and J. The center taps of the potentiometers 40 through 48 are connected through a switch 41, 43, 45, 47, or 49 in each module 30 through 38 to connection point H.

Because the feed rate must decrease as the process load increases, the relationship between load rate variation and feed rate variation must be inverse, as shown in FIG. 7. As described previously, the load or converter output voltages produced by the converter 24 are in direct relationship to the process current. I accomplish the inversion of the load or converter output voltages in the following manner. Each of the switches 41 through 49 are normally in the closed position such that the center taps of the potentiometers 40, 42, 44, 46, and 48 are normally connected to connection point H. As the load voltage to which each module is sensitive is produced, the switches 41 through 49 will successively opened, thus disconnecting the center tap of each potentiometer 40 through 48. This increases the resistance as the load increases, thereby decreasing the feed voltage to the motor controller 18.

For example, assume step module 30 is sensitive to 0.8 volts, module 32 is sensitive to 1.2 volts, and module 34 is sensitive to 1.6 volts. At the time the load voltage produced by the converter 24 is 0.8 volts, the center tap of potentiometer 40 will be opened, thereby increasing the resistance and lowering the feed voltage by a preset value. Should the load increase such that the load voltage reaches 1.2 volts, the center tap of module 30 would remain open and the center tap of module 32 open, thereby increasing the resistance and lowering the feed voltage by a second preset value. Should the load increase further and the load or converter output voltage reach 1.6 volts, an equivalent functioning will occur, thereby increasing the resistance and lowering the feed voltage by a third preset value. By employing potentiometers, I accomplish the ability to vary the successive resistances and therefore the feed voltage to any value desired, even down to zero. Thus, the step modules are activated by the converter output voltage and are responsive to the converter output voltage to supply the various preset feed voltages to the feed drive (i.e., to DC motor controller 18).

Referring to FIG. 3, each module is symbolically shown to be a solid state unit having a variable resistance for controlling the trigger mechanism of each module. I.e., the load voltage at which any module is triggered may be adjusted. E.g., at a lower limit, which would produce no feed, this may be adjusted or an upper limit, which would produce no feed, it may be adjusted. The modules I prefer to employ are ANA-Log Set-Point Modules, Model #30208, manufactured by Simpson, 5200 West Kinzies, Chicago, Ill. 60644. By providing variable trigger points, (including upper limits and lower limits), which variable trigger points constitute means for each step module for varying the preset converter output voltage at which the corresponding trigger operates, I have provided the capability for adjusting the breadth of the load ranges and the values of process current falling within them by concurrently adjusting the trigger points of the modules and the set points of the meter as previously described. Those with ordinary skill in the art will understand that the feed for a very high and a very low load could be cut to zero. From the above it will be understood that converter 24 and interface block 26 constitute means electrically connected to the drive sensor 22 and to the feed drive (i.e., DC motor controller 18) for producing a plurality of preset feed voltages corresponding to a plurality of ranges of measured drive power, whereby when the measured drive power falls within a given range the feed rate corresponds to the feed voltage for that particular range of measured drive power.

CONTINUOUS MODE

Figure 4:
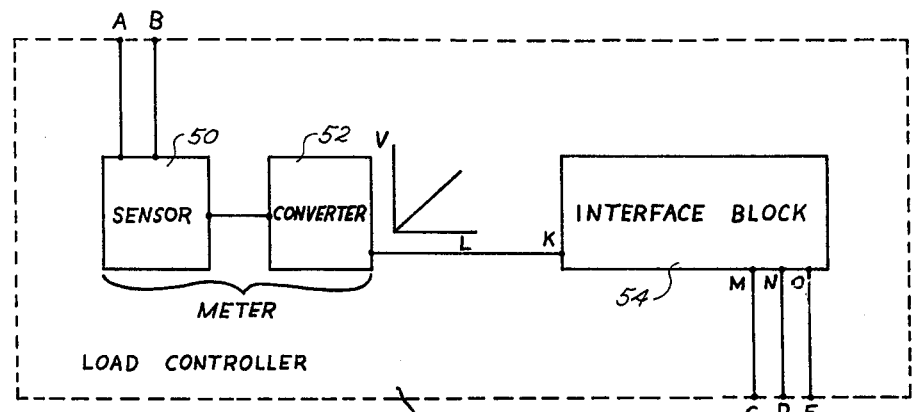
FIG. 4 is a block diagram of a continuous mode embodiment of the load controller of my invention.

Referring to FIG. 4, converter 52 of load controller 51 in the second embodiment or continuous mode of my invention converts the measured current into a load voltage for each measured value of the process current as measured by sensor 50. FIG. 8 illustrates that the load voltage V varies continuously with respect to the process current or load L and not in steps as does the step mode. The load controller 51 is connected at points A and B to the AC motor 14 and at points C, D, and E to the DC motor controller 18. Thus load controller 51 corresponds to load controller 20 of FIG. 1.

For this embodiment I prefer to employ a meter which combines the sensor 50 and the converter 52 in one visual display unit. This meter outputs a given load DC voltage for each load current over the range of variance of the process current. The ammeter I prefer also has set points by which maximum and minimum limits may be set. Such meters are commercially available; I employ model #9270 Lumigraph manufactured by Sigma Instruments, Inc., address El Segundo, California.

Figure 5:
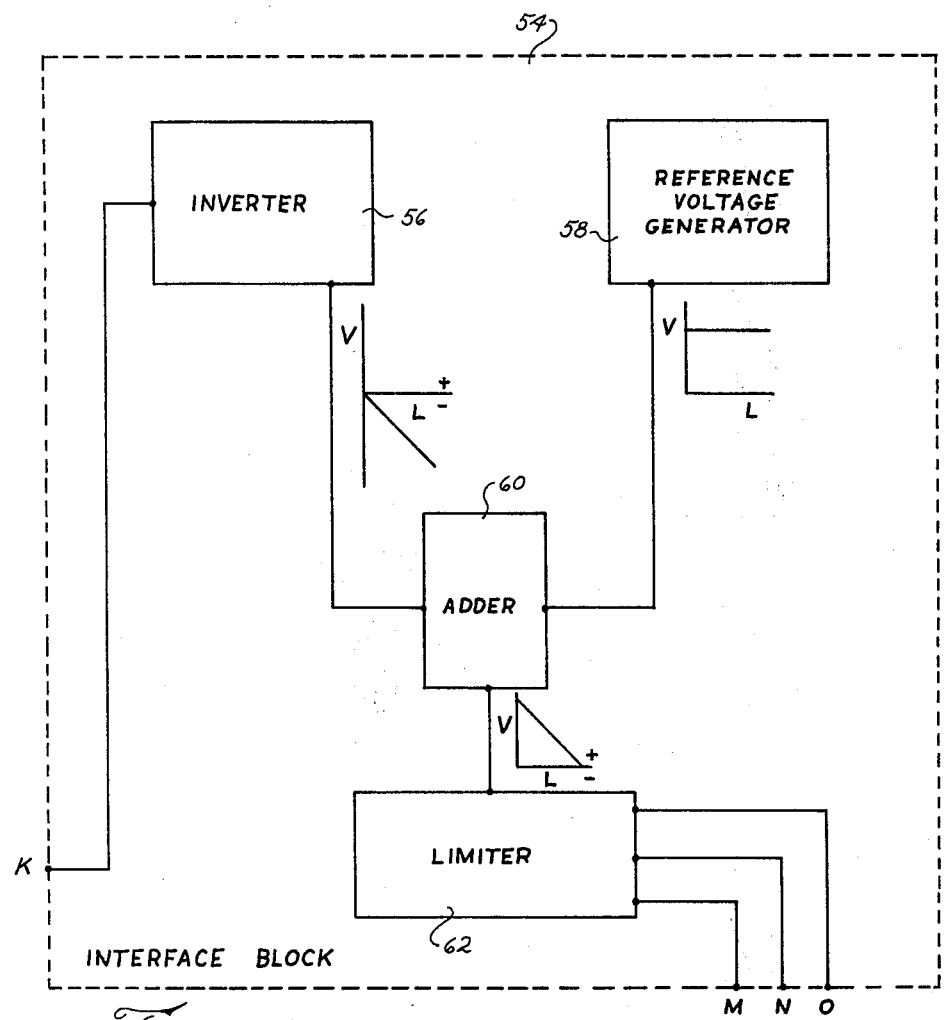
FIG. 5 is a block diagram of the interface block thereof.

Interface block 54 is connected at point Q to the converter 52 and at points M, N, and O to the output of the load controller 51. Referring to FIG. 5, inverter 56 inverts the positive load voltage generated by the converter 52 into a negative load voltage. Reference voltage generator 58 produces a preset reference voltage which may be adjusted. The reference voltage generator 58 and the inverter 56 are electrically connected to adder 60. The adder 60 combines the reference voltage with the inverted load voltage to produce a feed voltage. Therefore, as seen in FIG. 9, the interface block transforms the load voltage V into a given feed voltage F that varies continuously as the load voltage V varies and as the process current L varies.

Although not absolutely necessary for the functioning of the invention, I prefer to employ a limiter 62 which limits the value of the feed voltage to a predetermined amount such that variance in the feed voltage to the DC motor controller 18 may take place below the limited amount, yet may not exceed the amounts preset in the limiter 62. The individual elements shown in FIG. 5 are all well known to the art.

Therefore, it may be seen that as the load rate increases, the current drawn will increase, thereby producing an increase in the load voltage through the converter 24. The inverted load voltage will therefore be a greater negative number and, when added to the positive reference voltage, will produce a lower feed voltage, thereby reducing the speed of the DC motor 16 and achieving a corresponding reduction in the feed rate. In this way, the load is controlled by continuously varying the feed rate relative to variations in the load.

The elements which have been described may be easily connected with the necessary circuitry by anyone with ordinary skill in the art. Because of the broad applicability of my invention, complete circuit diagrams have not been included to avoid unnecessary compliation of the specifications. Each person with ordinary skill in the art using or making this invention will be able to connect the elements to correspond to the needs and peculiarities of his particular processing system.

Although the step mode and continuous mode may be altered to achieve the same function in the same way, it is anticipated that the cost of manufacturing the step mode will be significantly lower than the cost to manufacture the continuous mode. In addition, the step mode should be simpler to install and adjust, and should require less historical data on which to base the calculations of the process load function. The continuous mode will be advantageously used in processing systems requiring a finer degree of load control.

Thus it may be seen that I have invented a load controller having greater versatility and utility which regulates the load on processing machines by corresponding a given preset feed rate to each load.

As an aid to correlating the terms of the claims to the exemplary drawing, the following catalogue of elements is provided.

| 10 | processing machine | 41 | switch |
|----|-------------------|----|--------|
| 11 | material | 42 | potentiometer |
| 12 | feeder | 43 | switch |
| 14 | AC motor | 44 | potentiometer |
| 16 | DC motor | 45 | switch |
| 18 | DC motor controller | 46 | potentiometer |
| 20 | load controller | 47 | switch |

-continued

| 22 | sensor | 48 | potentiometer |
|----|--------|-----|---------------|
| 24 | converter | 49 | switch |
| 26 | interface block | 50 | sensor |
| 30 | step module | 52 | converter |
| 32 | step module | 54 | interface block |
| 34 | step module | 56 | inverter |
| 36 | step module | 58 | ref. V. generator |
| 38 | step module | 60 | adder |
| 40 | potentiometer | 62 | limiter |

The embodiments shown and described above are only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a processing system having
   a. a processing machine,
   b. a feeder for feeding material to the processing machine,
   c. a process drive connected to the processing machine,
   d. a drive power required by the process drive being related to a process load placed on the process drive,
   e. a feed drive connected to the feeder,
   f. a feed rate from the feeder to the processing machine having an effect on the process load,
   g. the feed rate being directly related to the speed of the feed drive,
   h. the speed of the feed drive being controlled by varying a feed voltage thereto, and
   j. a drive sensor connected to the process drive for measuring the drive power;
the improved load controller for regulating the process load comprising in combination with the above:
   k. translation means electrically connected to the drive sensor and to the feed drive for producing a plurality of preset feed voltages corresponding to a plurality of ranges of measured drive power, whereby when the measured drive power falls within a given range the feed rate corresponds to the preset feed voltage for that particular range of measured drive power, said translation means including means for setting and measured drive power ranges.

2. The invention as defined in claim 1 wherein the feed drive further comprises:
   m. a direct current electric motor, and
   n. a direct current motor controller electrically connected to the direct current electric motor.

3. The invention as defined in claim 2 further comprising:
   o. the process drive is an alternating current electric motor, and
   p. the drive sensor measures electrical power.

4. The invention as defined in claim 1 wherein
   l. the material fed into the processing machine is cottonseed before delinting,
   m. the processing machine is a saw delinter, and
   n. the feeder is a cottonseed feeder/cleaner.

5. The invention as defined in claim 1 wherein
   l. each range of drive power is bounded on at least one side by at least one of said ranges,
   m. the preset feed voltages corresponding to the ranges of drive power forming a step function for varying the speed of the feed drive in steps relative to variations in the measured value of the drive power.

6. The invention as defined in claim 1 wherein the translation means comprises:
   l. a converter electrically connected to the drive sensor for electronically converting the measured drive power into a converter output voltage such that for each value of drive power corresponding to a particular load on the process drive, a converter output voltage representing that load is produced, and
   m. at least three step modules electrically connected to the converter,
   n. the step modules being activated by the converter output voltage and being responsive to said voltage to supply the plurality of preset feed voltages to the feed drive.

7. The invention as defined in claim 6 wherein each step module further comprises:
   o. an electric module circuit connected to the feed drive providing means for producing a preset module voltage when activated,
   p. an electric module switch providing means for activating the module circuit,
   q. a trigger connected to the module switch providing means for engaging and disengaging the module switch,
   r. the trigger being electrically connected to the converter, and
   s. the trigger being activated when a converter output voltage having a magnitude corresponding to that particular step module is produced by the converter.

8. The invention as defined in claim 7 further comprising:
   t. means for each of the step modules for varying the preset converter output voltage at which the corresponding trigger operates.

9. The invention as defined in claim 7 further comprising:
   t. the module voltage of each of the step modules means for varying.

10. The invention as defined in claim 9 further comprising:
    u. means for each of the step modules for varying the preset converter output voltage at which the trigger operates.

11. The invention as defined in claim 6 wherein
    o. the material fed into the processing machine is an amorphous mass.

12. The invention as defined in claim 11 wherein
    p. the material fed into the processing machine is fuzzy cottonseed,
    q. the processing machine is a saw delinter, and
    r. the feeder is a cottonseed feeder/cleaner.

13. The invention as defined in claim 12 further comprising:
    s. an upper limit providing means for producing a feed voltage which produces no feed from the feeder, t. a lower limit providing means for producing a feed voltage which produces no feed from the feeder, and u. the upper limit and lower limit are adjustable.

14. The invention as defined in claim 1 further comprising:

m. an upper limit providing means for producing a feed voltage which produces no feed from the feeder, and n. lower limit providing means for producing a feed voltage which produces no feed from the feeder.

15. The invention as defined in claim 14 wherein o. the upper limit and lower limit are adjustable.

16. In a processing system having a. a processing machine, b. a feeder for feeding material to the processing machine, c. a process drive connected to the processing machine, d. a drive power required by the process drive being related to a process load placed on the process drive, e. a feed drive connected to the feeder, f. a feed rate from the feeder to the processing machine having an effect on the process load, g. the feed rate being directly related to the speed of the feed drive, h. the speed of the feed drive being controlled by varying a feed voltage thereto, and j. a drive sensor connected to the process drive for measuring the drive power;

the improved method for regulating the process load comprising the steps of:

k. setting a plurality of ranges of measured drive power, m. translating the measured drive power into a plurality of preset feed voltages corresponding to the plurality of ranges of measured drive power, thereby n. varying the speed of the feed drive such that for each range of drive power, a preset feed drive speed exists, thereby o. regulating the process load such that for each load condition corresponding to a measured drive power within one of said set ranges a preset rate of feed exists.

17. The invention as defined in claim 16 wherein the measured drive power is translated into the feed voltage by o. defining at least three predetermined drive power ranges, p. converting the measured value of the drive power falling within one of said predetermined drive power ranges into a converter output voltage having a magnitude corresponding to the appropriate range, q. activating a step module responsive to the magnitude of the converter output voltage, r. producing a preset module voltage from the activated step module, and s. supplying the preset module voltage as a feed voltage to the feed motor.

18. The invention as defined in claim 17 wherein the module voltage is produced by t. activating a trigger which is sensitive to a particular converter output voltage, u. engaging and disengaging a module switch with said trigger which activates a module circuit, and v. producing the preset module voltage with the activated circuit.

19. The invention as defined in claim 6 wherein o. each of the step modules produces a preset module voltage when activated by the converter output voltage.

20. The invention as defined in claim 19 wherein the preset module voltage of at least three of the step modules differ from each other.

21. The invention as defined in claim 19 wherein p. each preset feed voltage corresponds to the preset module voltage of at least one of the step modules.

22. The invention as defined in claim 6 wherein the converter further comprises:

o. means for converting the measured drive power into a converter output voltage such that for each value of drive powewr within one of the ranges of measured drive power, a converter output voltage having a magnitude corresponding to that range is produced.

* * * * *